United States Patent [19]
Harris et al.

[11] 4,300,173
[45] Nov. 10, 1981

[54] DATA RECORDING AND READING CIRCUITRY

[75] Inventors: Murray T. Harris, Sunnymead; Curtis D. Solheim, Yorba Linda, both of Calif.

[73] Assignee: The Perkin-Elmer Corporation, Norwalk, Conn.

[21] Appl. No.: 117,695

[22] Filed: Feb. 1, 1980

[51] Int. Cl.³ .............................................. G11B 5/09
[52] U.S. Cl. ..................................................... 360/51
[58] Field of Search ............................ 360/51, 28, 27

[56] References Cited
U.S. PATENT DOCUMENTS

| | | | |
|---|---|---|---|
| 3,141,926 | 7/1964 | Newell | 360/27 |
| 3,483,540 | 12/1969 | Damron | 360/27 |
| 3,938,184 | 2/1976 | de Francesco et al. | 360/28 |

Primary Examiner—Vincent P. Canney
Attorney, Agent, or Firm—S. A. Giarratana; T. P. Murphy

[57] ABSTRACT

Circuitry for recording and subsequently reading magnetic tape recorded binary data without tape flutter. The circuitry includes time base correction circuitry to assure a precise crystal controlled data output and a precise long-term data output speed to thereby assure against loss of data being transmitted from the system during a fixed time frame.

8 Claims, 12 Drawing Figures

DATA RECORDING AND READING CIRCUITRY

BRIEF SUMMARY OF THE INVENTION

This invention relates to data recording and reading circuitry and particularly to recording circuitry that combines a binary input signal with tone bursts of an optimum recording frequency and to reading circuitry that receives the tone bursts and reproduces the original binary signal without the fluttering inherent in recording systems and which provides a time base correction for long-term speed variations that may result in loss of data.

In many instances it is necessary to reproduce a certain amount of taped binary data within a certain time frame or to reproduce it in synchronism with some other time clocked events. For example, it may be desired to transfer binary data at some fixed rate from a magnetic tape into a computing system rotating memory. In such case it would be necessary to assure that the data from the tape flowed at a very constant rate and without the usual flutter that is inherent in tape cassettes and recording mechanisms. Furthermore, it would obviously be necessary that this constant rate be precise over the entire length of the tape so that all of the speed data is transferred within the proper time frame and that no data may be lost by long-term speed variations in the mechanisms.

The circuitry of the invention includes both recording and reading circuitry. The recording circuitry receives binary input signals, referred to hereinafter as NRZ signals, and converts them into "bi-phase" in which a binary "1" input appears as a "1—0" output having a length of one clock bit, and a binary "0" input is converted into a "1—0" output of two clock bits in length. These bi-phase signals then modulate a tone burst having an optimum frequency for the particular magnetic recording system. If two tape speeds are to be employed, for example 15/16 inches per second for normal recording and reading and perhaps 30 inches per second for dubbing, the tone burst frequencies may be 800 Hz and the proportionally high frequency of 25.6 KHz so that, at either speed, the same number of tone burst pulses are present in the recorded bi-phase envelopes.

For reasons to be subsequently explained, it is important that the binary input signals be formed in alternate short sections of input data signals followed by a series of zero bits which comprise a reservoir sink or preamble section. In the preferred embodiment to be described hereinafter, twenty data bits of NRZ are followed, or preceded, by thirty zero bits of reservoir. It is also necessary that the data bit section start and end with a binary "1" to thus establish the boundaries of both data and reservoir sections during either forward or reverse operation of the magnetic tape.

In reading the tape, the read circuitry receives the bi-phase modulated tone burst signals from its associated read head, filters the signals through a band pass filter, demodulates out the tone burst frequencies to obtain the bi-phase envelope and converts back to the NRZ data signal. This converted signal, which may contain flutter irregularities, is then introduced into a serial-input-serial-output register, referred to hereinafter as a "FIFO," by an input clock derived from the bi-phase to NRZ converter. Since this clock has the same time base error as the NRZ signal, the individual bits are coherently entered into the FIFO. The NRZ data is then read out of the FIFO at a fixed, crystal controlled clock rate to assure precise timing.

The input and output clock of the FIFO register is monitored by an 8-bit up/down counter. The input clock increments the counter up to a count of 8 at which point the crystal controlled output clock both decrements the counter and enables a flip-flop that begins outputting of FIFO data now delayed by 8 bits. The up/down counter thus assures that the FIFO register does not go empty or fill up during a worst case flutter condition. In the event that it does, however, a reset occurs and an 8-bit buffer zone is automatically re-established.

In addition to the bit-by-bit time base correction described above, it is necessary to correct for long term variations to ensure that the average input rate equals the average output rate. Comparison circuitry associated with the up/down counter can temporarily disable the FIFO register input clock or output clock to assure that the number of bits contained in the FIFO register remains constant to be then clocked out at a crystal control rate with no discernible bit jitter.

DESCRIPTION OF THE DRAWINGS

In the drawings which illustrate a preferred embodiment of the invention.

DETAILED DESCRIPTION OF THE PREFERRED EMBODIMENT

Figure 1:
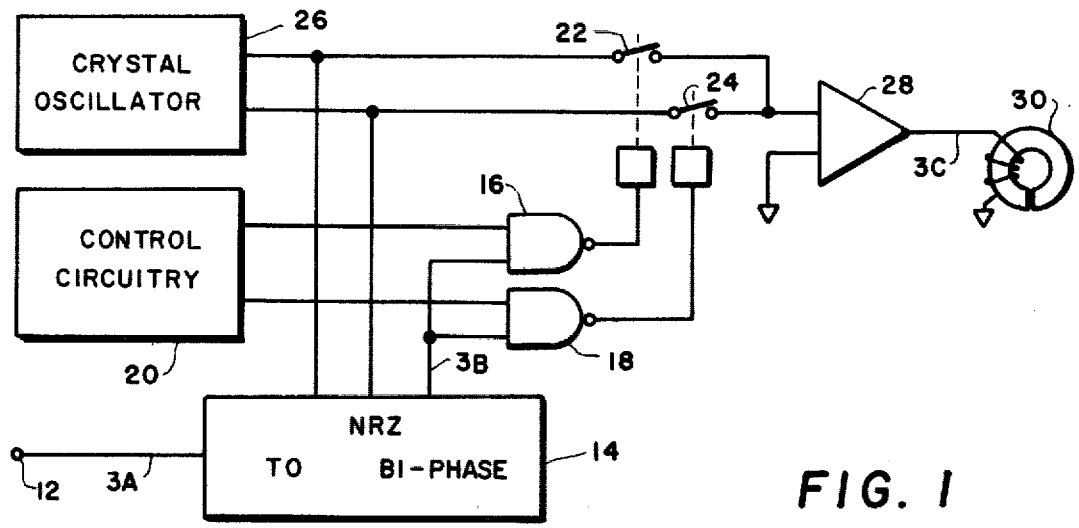
FIG. 1 is a simplified block diagram of the magnetic recording circuitry of the invention.

As illustrated in the recording circuitry block diagram of FIG. 1, binary input data is applied from an external source to an NRZ input terminal 12 and is converted by the converter 14 into a bi-phase signal. In a bi-phase signal the NRZ input binary signal is represented by a newly generated binary signal in which an NRZ binary "1" is now a "1—0" of a predetermined length, and an NRZ binary "0" is a "1—0" of twice the length, as best illustrated in the waveform diagrams A and B of FIG. 3. The output of the bi-phase converter 14 is applied as one input to each of the AND-gates 16 and 18. In the preferred embodiment, the recording may be performed at either one of two speeds: 15/16 inches per second for data recording and reading, and 30 inches per second for dubbing. The selection of these two speeds may be made by some external signal, or manually by an appropriate control circuit 20, the selected output of which enables either the gates 16 or 18 to admit the bi-phase signal to the appropriate control element of the transmission gates 22 or 24.

Since the relatively low frequency square wave bi-phase signals would not accurately record on typical magnetic recording mediums without waveform degradation, the bi-phase signals applied to the transmission gates 22 and 24 are used to trigger tone bursts of more practical recording frequencies. In the preferred embodiment, an 800 Hz tone has been selected to be recorded at a speed of 15/16 inches per second or the proportionately higher tone of 25.6 KHz will be recorded at the dubbing speed of 30 inches per second. These two frequencies are accurately generated by crystal oscillator 26, the output signals of which are applied to the transmission gates 22 and 24 and also to the converter 14 as will be explained in detail in connection with FIG. 4.

The output terminals of the transmission gates 22 and 24 are coupled together and to a suitable recording amplifier 28, the output of which is applied to a suitable recording transducer 30.

In operation, the recording speed is selected at the control circuitry 20 which enables either the AND-gate 16 or 18 to therefore apply the converted NRZ to bi-phase signals to transmission gates 22 or 24, respectively. If the slower recording speed is selected, the bi-phase signals are applied through AND-gate 16 to operate transmission gate 22 in accordance with the bi-phase signal. Thus, bi-phase pulses modulated at an 800 Hz frequency, such as illustrated in FIG. 3C, are amplified and recorded by the transducer 30.

Figure 2:
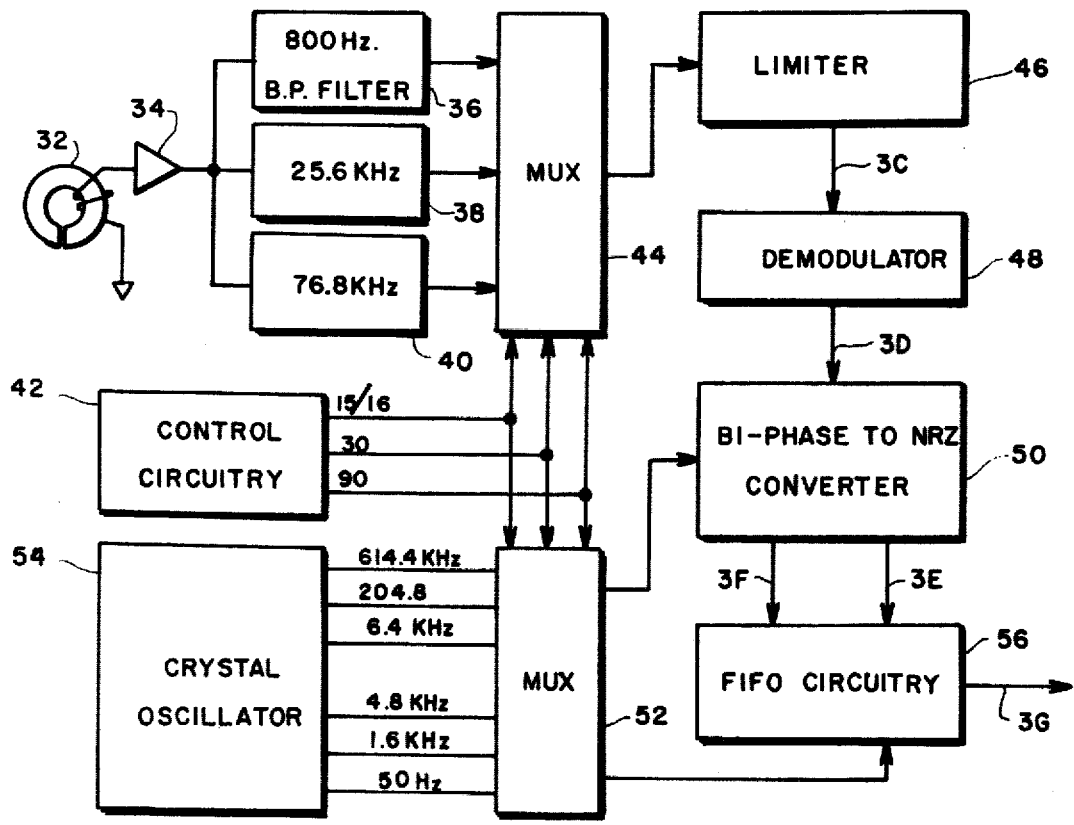
FIG. 2 is a simplified block diagram of the reading circuitry of the invention.

FIG. 2 is a simplified block diagram illustrating the read circuitry of the invention. In the preferred embodiment, three read speeds are provided: The 15/16 inches per second read/record tape speed, the 30 inches per second for dubbing, and a high speed 90 inches per second for data search or addressing specific locations on tapes which may normally run three hours or more at the 15/16 inches per second speed. In the read circuitry of FIG. 2, the magnetic tape is read by a transducer 32, the output of which is amplified at 34 and applied to the input terminals of three band pass filters 36, 38 and 40 which are designed to pass only the 800 Hz, 25.6 Kz, and the higher 76.8 KHz tone burst frequencies.

Figures 3A, 3B, 3C, 3D, 3E, 3F, 3G:
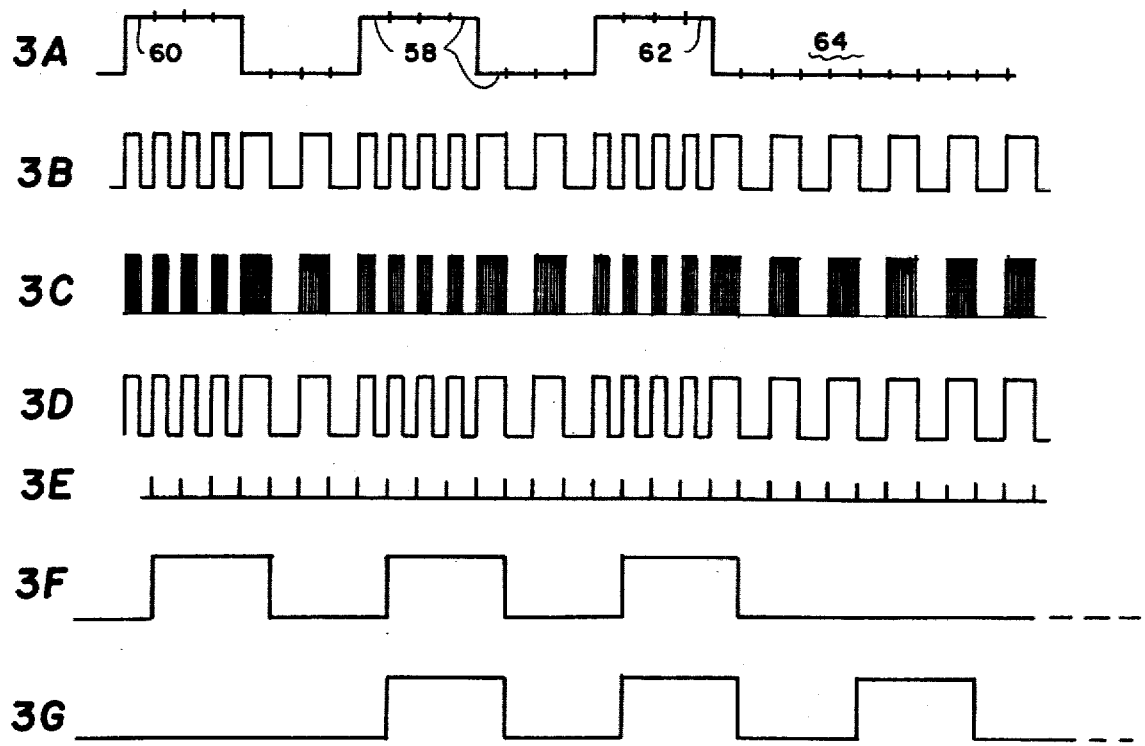
FIGS. 3A through G are diagrams illustrating typical waveforms at various points in the circuitry.

Speed control circuitry 42, similar to the circuitry 20 of FIG. 1, produces an output signal representing the desired one of the three magnetic tape speeds and multiplexing circuitry 44, responsive to the signals from the control circuitry 42, transfers the corresponding tone burst signals from the selected one of the band pass filters 36, 38 or 40 to an amplitude limiter 46, the output signals from which appear in FIG. 3C.

The amplified limited tone burst signals are demodulated at the demodulator 48 in FIG. 2 to produce a bi-phase output signal, FIG. 3D, similar to the signal generated by the converter 14 of FIG. 1, and the bi-phase output of the demodulator 46 is then applied to a bi-phase-to-NRZ converter 50.

The three output signals from the speed control circuitry 42, that are applied to the multiplexer 44, also control a dual multiplexer 52 which selectively admits one of three pairs of operating frequencies into the read circuitry from a crystal oscillator 54. In the preferred embodiment, an output signal from control circuitry 42 representing the tape speed of 15/16 inches per second will enable multiplexer 52 to admit to the read circuitry the frequencies of 50 Hz and 6.4 KHz. At 30 inches per second, the frequencies of 1.6 KHz and 204.8 KHz are admitted and the proportional higher frequencies of 4.8 KHz and 614.4 KHz are admitted at a 90 inches per second tape speed. As will be subsequently explained in connection with FIGS. 5 and 6, these are operational frequencies and are used for the purpose of clocking various counters throughout the circuitry.

The bi-phase-to-NRZ converter 50 receives the demodulated bi-phase signal from demodulator 48 and converts it back to an NRZ binary output signal similar to that which was originally introduced into the input terminal 12 of FIG. 1. The converter 50 also generates from the bi-phase signal a clocking signal which, in ideal situations, would precisely conform to the recording system clock shown super-imposed on the NRZ input signal of FIG. 3A. However, mechanical inaccuracies and speed variations inherently produced by tape drive mechanisms produces a flutter, albeit minimal, which prevents the output clock signal, FIG. 3E, from precisely conforming to the input clock signal appearing superimposed on FIG. 3A. This flutter or irregularity is eliminated by the FIFO circuitry 56 of FIG. 2.

FIFO circuitry 56 includes a 16-bit serial register that receives its input data, FIG. 3F, from the bi-phase-to-NRZ converter 50 in accordance with an input clock signal, FIG. 3E, generated within the converter 50. The input clock therefore also contains the flutter. The register in the FIFO circuitry 56 outputs its data in accordance with a crystal controlled clock signal generated by the crystal oscillator 54 so that the data output signals, FIG. 3G, are precise and no longer contain the flutter irregularities. In addition to the first-in-first-out register, the FIFO circuitry 56 includes circuitry for correcting long-term variations in tape speeds such as may be encountered from speed variations in the tape drive motor by inaccurate AC power frequencies. It is apparent that these various corrections may require "rest periods" in the incoming taped NRZ data so that the taped data does not overtake the corrected output of the read circuitry. Hence, the NRZ input data contains preamble or reservoir intervals.

As previously mentioned, FIGS. 3A through 3G are waveform diagrams illustrating the various waveforms at points throughout the recording and read circuitry. FIG. 3A illustrates a binary waveform which may be applied to the input terminal 12 of FIG. 1 and is illustrated with superimposed bit marks 58 corresponding to the record circuitry clock. As explained above, the circuitry of the invention corrects for flutter irregularities inherent in recording systems and, in makine such corrections, requires that the NRZ input data include reservoir intervals that provide a sink which may be compressed or expanded in order to correct for such irregularities. In the preferred embodiment, the input data is confined into intervals of 20 clock bits followed by a preamble or reservoir of 30 bits with each bit at the normal read/record speed of 15/16 inches per second having a total length of 20 milliseconds. Furthermore, the first and last bits 60 and 62, respectively, of each 20-bit interval, must be a binary "1" to identify the beginning of each data interval from the surrounding reservoir intervals 64. It will be noted that if the recorded binary data is to be used to search various portions of a long magnetic tape, the initial bits 60 and 62 signal a data block starting point that enables the tape to be read in either direction.

FIG. 3B illustrates the result of converting NRZ data of FIG. 3A into bi-phase signals in which high and low binary NRZ input bits are represented by a "1–0" having a wavelength or phase dependent upon the state of the input signal. Thus, when the NRZ input signal is high, such as the initial bit 60 of FIG. 3A, the corresponding generated bi-phase signal is a "1" followed immediately by a "0," each having a pulse width of one-half bit. If, however, the NRZ signal is low, such as any of the NRZ input bits contained in the reservoir 64, the corresponding bi-phase signal is a "1–0," each being one bit in width.

FIG. 3C illustrates the various tone bursts generated by modulating a higher frequency suitable for recording with the bi-phase signals of FIG. 3B. As will be explained in connection with FIG. 4, the narrower tone bursts of FIG. 3C that represent a "1" NRZ input of FIG. 3A, contain precisely eight pulses of the tone bursts frequency and are separated by an identical interval; whereas the wider tone bursts representing a NRZ binary "0," have precisely sixteen pulses at the tone burst frequency and are similarly spaced by an identical sixteen pulse interval.

FIG. 3D represents the demodulated bi-phase output of the demodulator 48 of FIG. 2. FIG. 3E represents the input clock signal generated from the bi-phase signal by the bi-phase-to-NRZ converter 50 of FIG. 1, whereas FIG. 3F represents the NRZ data produced by the converter 50. As previously explained, the clock signal 3E and data signal 3F may contain flutter which may be intolerable for certain applications and which is eliminated by the FIFO circuitry 56 of FIG. 2. Since the correction may require delays in the input or output of the FIFO circuitry, the FIFO circuitry delays the output signal 3G by eight binary bits, as will be subsequently explained.

Figure 4:
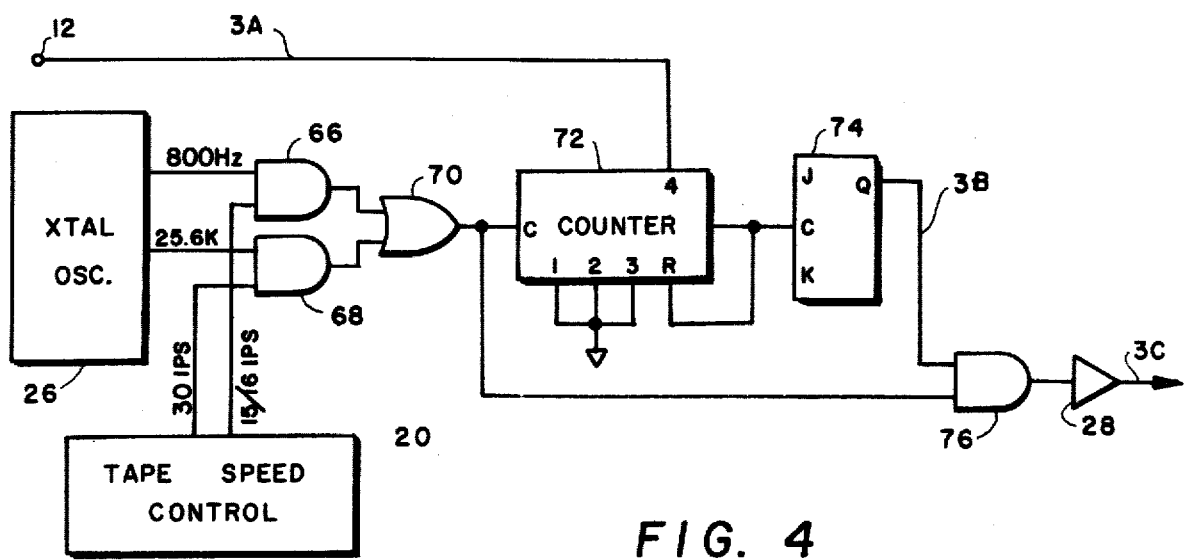
FIG. 4 is a simplified schematic diagram of the recording circuitry of FIG. 1.

FIG. 4 is a simplified schematic diagram of the recording circuitry of FIG. 1 and illustrates a preferred embodiment of the circuitry for generating the tone bursts of FIG. 3C. In FIG. 4, the crystal oscillator 26 generates output signals of 800 Hz and 25.6 KHz respectively into AND-gates 66 and 68, the outputs of which are applied to the input terminals of an OR-gate 70. The tape speed control 20 generates an output signal corresponding to a desired tape speed of 15/16 inches per second or 30 inches per second as previously discussed. These signals respectively enable the AND-gates 66 and 68. It should be noted that, if the signals from oscillator 26 are not sufficiently square, the AND-gates 66 and 68 and the OR-gate 70 may be transmission gates, such as the gates 22 and 24 described in connection with FIG. 1. The output of the OR-gate 70, which is at a frequency of either the read speed of 800 Hz or dubbing speed of 25.6 KHz is applied to the clock input terminal of a counter 72. Counter 72 is preferably a 4-bit counter, such as a CMOS type 40161, which normally will produce an output pulse for every sixteen clock pulses. The NRZ input terminal 12 is, however, connected to the counter 72 to provide a preset so that when the NRZ input data is low, counter 72 will count to sixteen clock pulses and, when the input data is high, the high input at the $2^4$ terminal of the counter 72 will force the counter to generate its output pulse after each count of "8." The output terminal of the counter 72 is applied back to its own reset terminal to reinitiate the count and is also applied to the clocking terminals of the JK flip-flop 74 which toggles with the wave front of each input clock pulse to produce a bi-phase output signal such as illustrated in FIG. 3B. The output of the flip-flop 74 is applied as one input terminal to an AND-gate 76, the second input of which is coupled to the output of the OR-gate 70. Thus, the output of the AND-gate 76 reproduces the higher tone burst frequency from the crystal oscillator 26 only during the high state of the bi-phase signal and these tone bursts, shown in FIG. 3C, are then amplified and recorded as described in connection with FIG. 1.

Figure 5:
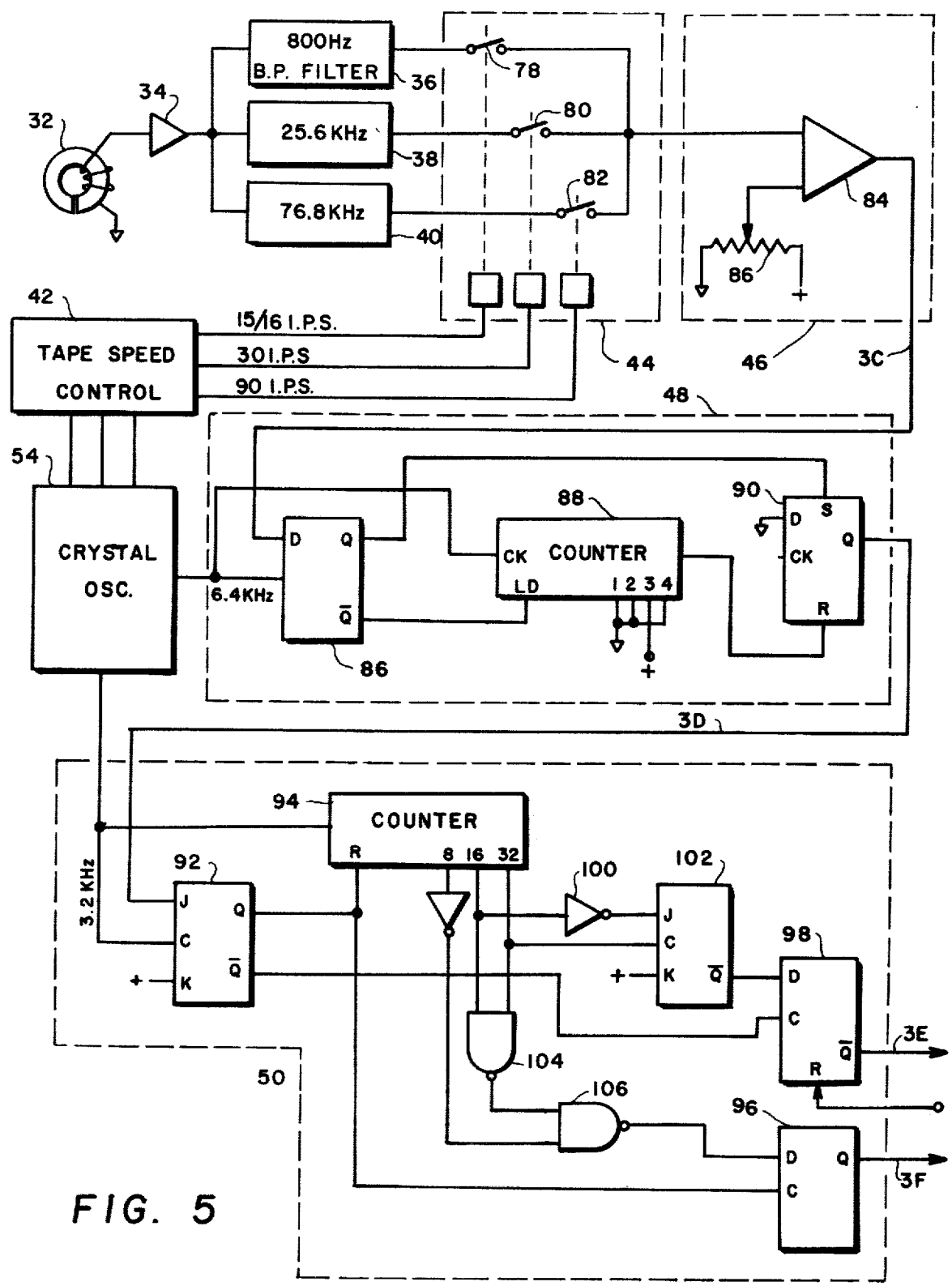
FIGS. 5 and 6 are simplified schematic diagrams illustrating the reading circuitry of FIG. 2.

FIG. 5 is a schematic diagram of a portion of the circuitry of FIG. 2 and includes, in block form, the recording transducer head 32, amplifier 34, and band pass filters 36, 38 and 40 of FIG. 2. Because the selected frequency sensed by the transducer 32 produces a signal that is analog in nature, the conventional AND-gates cannot be used in the multiplexer 44 and the circuitry therefore includes three transmission gates 78, 80 and 82, the corresponding control elements of which are controlled by the tape speed control 42. The output terminals of the gates 78, 80 and 82 are combined together and applied to the input terminal of the amplitude limiter 46 which is preferably an amplitude limiting comparator comprising an operational amplifier 84, the non-inverting input terminal of which is coupled to the adjustable wiper of a potentiometer 86 coupled between a positive potential, of for example 5 volts and ground. The output of the limiter 46 comprises the tone burst signals illustrated in FIG. 3C. These signals are applied to the demodulator circuitry 48 as previously explained.

The input terminal of the demodulator 48 receives the tone burst signals from the limiter 46 and applies them to the D input of a flip-flop 86. The clock input to the flip-flop 86 is obtained from the crystal oscillator 54 and at the normal read/record frequency of 15/16 inches per second the clock input is at a frequency of 6.4 KHz. It will be noted that the dual multiplexer 52 of FIG. 2 has been omitted from FIG. 5. It is to be understood that all frequenices mentioned hereinafter are assumed to be those associated with the read/recording speed of 15/16 inches per second and that if higher tape speeds are to be considered, the corresponding frequency pairs generated by the crystal oscillator 54 and presented by the dual multiplexer 52 of FIG. 2 are used. Hereinafter it will be assumed that the slower recording/read speed is being employed so that the crystal oscillator 54 of FIG. 5 will apply a 6.4 KHz clocking frequency to the clock input terminal of the flip-flop 86.

The D input terminal of flip-flop 86 receives the 800 Hz tone burst frequency modulated with the bi-phase signals, FIG. 3C, from the amplitude limiter 46 and the flip-flop is clocked at a frequency of 6.4 KHz. The false output of the flip-flop 86 is applied to the "load" input of a counter 88, the clock input terminal of which is coupled to the 6.4 KHz output of the oscillator 54. Counter 88 is a 4-bit counter, for example, the previously described type 40161, which normally produces a carryout output pulse after sixteen counts. In the present application, however, the counter 88 is preset to a count of four. The output of counter 88 is applied to the reset terminal of a non-toggling D flip-flop 90, the "set" terminal of which is connected to the true output of flip-flop 86. Each time a true output is produced by the flip-flop 86, the flip-flop 90 is set to provide, at its true output, a leading edge of the demodulated bi-phase signal. The counter 88 then begins to count toward 15 at a rate determined by the selected speed and previously discussed. If the counter reaches a maximum count before another tone burst pulse occurs from the limiter 46, a carry-out signal is generated which permits the reset of the flip-flop 90 and indicates the trailing edge of the bi-phase signal envelope. As long as a tone burst signal is present, the counter 88 is continually preset and does not generate a carryout.

The bi-phase output signal of the demodulator 48 is then applied to the input terminal of the bi-phase-to-NRZ converter 50 as previously explained. Converter 50 includes a JK flip-flop 92, the J terminal of which is connected to receive the bi-phase input signals from the demodulator, the K terminal of which is made permanently high, and the clock terminal of which receives a 3.2 KHz input signal from crystal oscillator 54. The true output of flip-flop 92 is coupled to the reset terminal of a counter 94 and to the clock terminal of a D flip-flop 96. The false output of the flip-flop 92 is coupled to the clock input of a D flip-flop 98. Counter 94 is a 32-bit counter and may be comprised of two type 4520 16-bit counters in series. Counter 94 is clocked by a divided 6.4 KHz or a 3.2 KHz signal from crystal oscillator 54 and output signals are taken from its 8, 16 and 32-bit terminals. The output from the 16-bit terminal is inverted at the inverter 100 and applied to the J input of a JK flip-flop 102, the K terminal of which is permanently high. The 32-bit output of the counter 94 is applied to the clock input terminal of the flip-flop 102. The 16 and 32-bit output terminals of the counter 94 are applied to the input terminals of a NOR-gate 104, the output of which is applied as one input to the NOR-gate 106. The 8-bit output terminal of the counter 94 is inverted and applied as the second input to the NOR-gate 106 and the output of the gate is applied to the D terminal of the flip-flop 96.

Each time a positive edge change is detected in the bi-phase input signal to the JK flip-flop 92, the counter 94 is reset and a time-out begins. If a second edge change takes place within ¾ of a bit time, a logic zero is loaded into the flip-flop 96. At the trailing edge of the bit time when the next phase change is detected, the flip-flop 98 produces an output strobe pulse. The output from the flip-flop 96 is the NRZ signal recovered from the bi-phase signal and is represented by the waveform in FIG. 3F. The strobe output signal of the flip-flop 98 is a clock signal derived from the bi-phase signal and is represented by the diagram of FIG. 3E. As previously discussed, both of these signals, being derived from the readback signal, will contain flutter variations to be eliminated by the subsequent FIFO circuitry.

Figure 6:
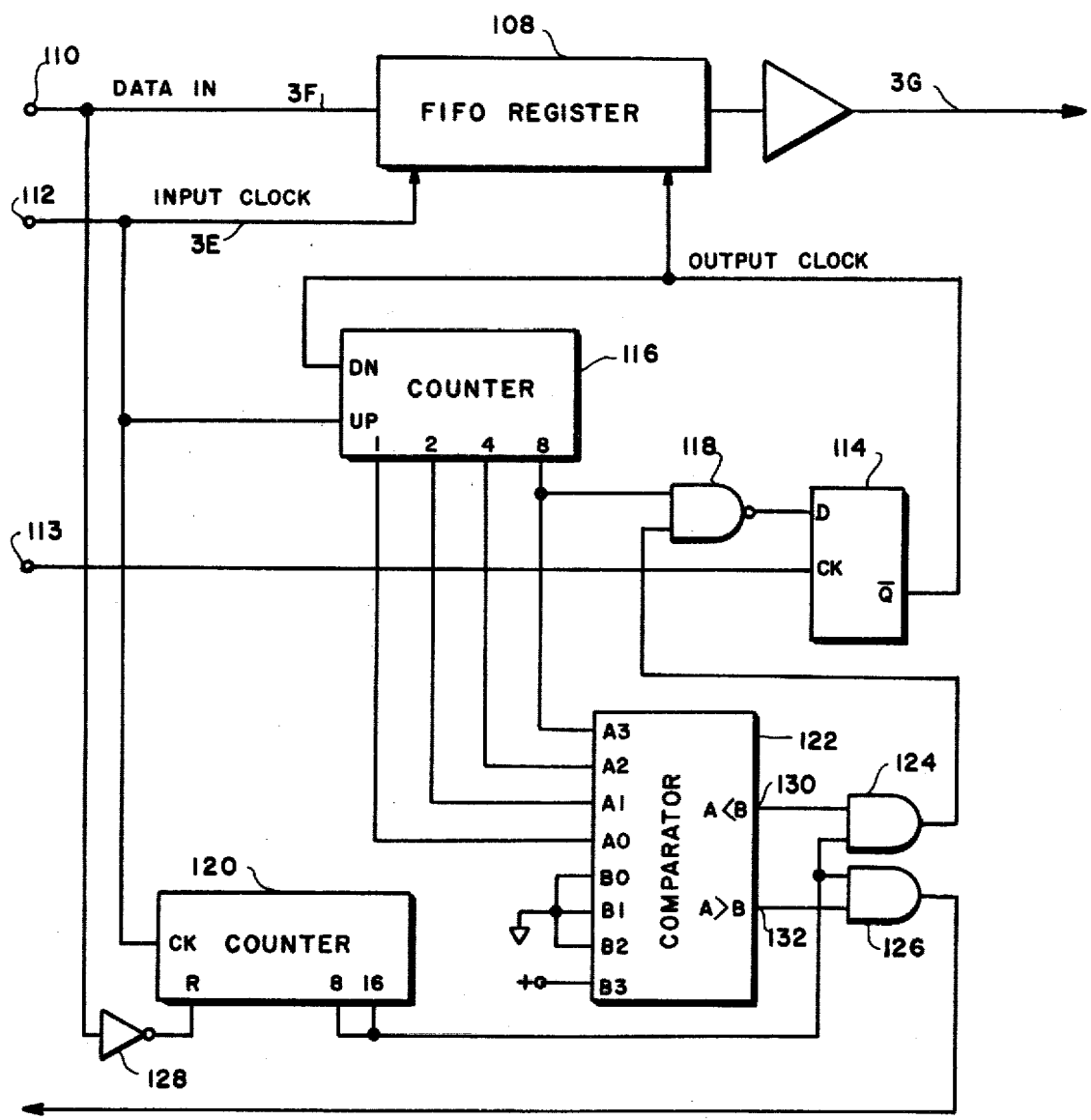

FIG. 6 is a schematic diagram of the FIFO circuitry 56 of FIG. 2 and includes a first-in-first-out 16-bit serial register 108 which may be a type 40105 CMOS register. NRZ binary input data from the converter 50 is applied to the register 108 through input terminal 110 and is clocked in by the input clock signal applied to input terminal 112. As previously described, the input clock signal is derived from the bi-phase signals and may contain intolerable flutter. The data contained in the FIFO register 108 is clocked out with an output clock derived from the crystal oscillator 54 and at the normal read/record speed of 15/16 inches per second, the clock signal applied to the input terminal 113 is at a frequency of 50 KHz. This signal from oscillator 54 is applied to the clock terminal of a D flip-flop 114, the function of which will subsequently be explained, and the false output of the flip-flop 114 is applied to the output clock terminal of the register 108.

De-fluttering of the NRZ data being played back requires time base correction on a bit-by-bit basis. This is provided by an up/down 4-bit counter 116, NAND-gate 118 and flip-flop 114. The "up" input terminal of the counter 116 is coupled to the input clock terminal 112 and the "down" input terminal of the counter 116 is coupled to the output clock terminal of the register 108. As each input clock pulse is applied to the register 108, the counter 116 is incremented. When counter 116 reaches a count of "8," the signal therefrom enables the flip-flop 114, thus permitting the 50 Hz signal applied to the input terminal 113 to begin outputting the 8 bits of data loaded into the 16-bit FIFO register 108. The operation of the up/down counter 116 therefore provides the 8-bit delay between the input and output of the register, as explained in connection with FIGS. 3F and G. As the register 108 is being unloaded by the output clock, the counter 116 is counting down toward its originating point, thus assuring that eight data bits are stored in the register 108 prior to their precise clocked output.

In addition to the bit-by-bit time base correction, it is necessary to correct for long-term variations to ensure that the average input data rate equals the average output rate. The circuitry for adjusting the length of the reservoir or preamble includes a "divide by 16" counter 120 such as a CMOS type 40193 circuit, a 4-bit signal comparator 122 such as a type 40085, and a pair of AND-gates 124 and 126. The clock input terminal of counter 120 is coupled to the FIFO register input clock terminal 112 to receive the clock bit generated from the bi-phase signals. The counter 120 reset terminal is connected through an inverter 128 to the input terminal 110 for receiving the data input signals therefrom. The 8 and 16-count terminals of the counter 120 are coupled together and provide enabling inputs to the AND-gates 124 and 126. Comparator 122 receives one set of four signals (A0 through A3) respectively from the 1, 2, 4, 8 output terminals of the up/down counter 116. The other three lower order inputs (B0-B2) to the comparator are grounded and the highest order input, B3, is connected to a positive 5-volt terminal to provide a permanent high level input. Comparator 122 has two output terminals. The signal is generated at output terminal 130 whenever the A input from the counter 116 is greater than the B input; the output terminal 132 emits a signal whenever the A input is less than the B input. Output terminal 130 is connected as a second input to the AND-gate 124 and output terminal 132 is connected as a second input to the AND-gate 126.

As previously mentioned, each time an individual bit is loaded into the FIFO register 108, the up/down counter 116 is incremented. Conversely, each time a bit is removed from the register by the output clock, counter 116 is decremented. At the same time, if the NRZ bit available at the data input of the register 108 is a logic "1," the counter 120 is incremented and whenever a logic "0" occurs, the counter 120 is reset. Counter 120 therefore serves to detect the point at which the preamble portion of the word is present while the up/down counter 116 keeps track of the number of bits contained in the FIFO register 108. When the counter 120 reaches a count of 24, the gates 124 and 126 are enabled and the output of the up/down counter 116 is compared against a fixed count of "8" by the comparator 122. If the count exceeds "8," the output of the AND-gate 124 will provide a disabling signal to NAND-gate 118 to further disable flip-flop 114 for one input clock bit. On the other hand, if the count is less than the preset count of "8," the signal appearing at terminal 132 of the comparator 122 produces a signal which is applied to the reset terminal of the flip-flop 98 of FIG. 5 to disable an input clock pulse to the FIFO register 108 of FIG. 6. In this manner, the number of bits in the FIFO register is automatically returned to "8" during the preamble portion of the signal and provides an assurance that the FIFO register 108 will not empty or fill during the data transmission portion of the word. The data bits are thus transmitted out of the FIFO register 108 at a crystal controlled rate with no discernible bit jitter.

As previously mentioned, the NRZ data being processed through the circuitry may in fact be various types of data address signals that may refer to other tracks of data that were simultaneously recorded on the magnetic tape. In such instances, it is only necessary that the address data, referred to herein as the NRZ data, be recorded in bi-phase modulated tone bursts and thereafter processed through the readout circuitry described herein. Other tracks of data simultaneously recorded with the NRZ data may be more simply processed and applied to corresponding FIFO registers similar to the register 108 described herein. These additional data registers for other data tracks will be clocked by an input clock coupled directly to the input terminal 112 of FIG. 6 and the data therein would be clocked out by the output clock generated by the output clock signal applied to the register 108 of FIG. 6. Therefore, the additional data thus simultaneously recorded would be clocked into its associated FIFO register at the rate containing the flutter but would be clocked out at the precise output clock rate corrected for bit-by-bit time base error and long-term variations.

Having thus described our invention, what is claimed is:

1. Data reading circuitry for removing mechanically induced flutter from first binary data signals recorded on mechanically driven recording media, said circuitry comprising:

transducing means positionable with respect to said recording media for sensing data signals recorded thereon and for producing corresponding electrical data signals;

signal processing circuitry coupled to said transducing means for forming said electrical data signals into second binary data signals similar to the originally recorded first binary data signals but subject to mechanically induced flutter;

clock generating circuitry associated with said signal processing circuitry for deriving first clock pulses from said electrical data signals;

oscillator means for providing precisely timed second clock pulses; and correcting circuitry including a first-in-first-out register coupled to said signal processing circuitry and responsive to said first and second clock pulses for receiving said second binary data signals in accordance with said first clock pulse rate and for clocking out said second binary data signals at said second clock pulse rate.

2. The circuitry claimed in claim 1 wherein said correcting circuitry includes long-term variation correction circuitry responsive to said first and second clock pulses and to said second binary data pulses for selectively inhibiting said first and second clock pulses from said first-in-first-out register for maintaining a constant predetermined number of bits of said second binary data pulses in said first-in-first-out register.

3. The circuitry claimed in claim 2 wherein said first binary data signals are recorded on said recording media in alternate data sections and reservoir sections, said reservoir sections providing a compressible and expandable sink for said second binary data signals clocked in and out of said first-in-first-out register by said inhibited first and second clock pulses.

4. The circuitry claimed in claim 3 wherein said first binary data signals are recorded on said recording media in tone bursts having an optimum recording frequency; and said signal processing circuitry includes tone burst demodulating circuitry.

5. The circuitry claimed in claim 4 wherein said tone bursts are modulated with bi-phase signals, each of said bi-phase signals comprising an alternate high and low pulse portion, each high and low portion having a first predetermined width to represent a first binary data signal pulse of a first state, and a second predetermined width for representing a first binary data signal pulse of a second state; and wherein said signal processing circuitry includes converting circuitry coupled to said tone burst demodulating circuitry for converting said bi-phase signals into second binary data signals.

6. The circuitry claimed in claim 5 wherein said bi-phase signals comprise pairs of alternate high and low portions of equal width, and wherein the total width of a high-low pair representing a high state of said first binary data signal is half the total width of a high-low pair representing a low state of said first binary data signal.

7. The circuitry claimed in claim 6 wherein said recording media is a magnetic recording tape recorded at a selected one of two tape speeds and read back by said transducer at a selected one of three playback speeds; and wherein said signal processing circuitry includes speed control circuitry coupled to said oscillator means for varying the frequency of said second clock pulses in accordance with said selected one of said three playback speeds.

8. The circuitry claimed in claim 7 wherein said oscillator means is a crystal controlled oscillator simultaneously generating a plurality of precision output signals; and wherein said speed control circuitry controls multiplexing circuitry coupled to the output of said crystal oscillator for the selection of second clock pulses and operational signals of varying frequencies.

* * * * *